United States Patent [19]

Tonutti

[11] Patent Number: 5,062,260
[45] Date of Patent: Nov. 5, 1991

[54] PULL TYPE BIFOLD HAY RAKE

[75] Inventor: Carletto Tonutti, Tricesimo, Italy

[73] Assignee: Tonutti S.P.A., Italy

[21] Appl. No.: 587,400

[22] Filed: Sep. 25, 1990

[30] Foreign Application Priority Data

Mar. 2, 1990 [IT] Italy .............................. 83341/90[U]

[51] Int. Cl.5 ........................................... A01D 78/00
[52] U.S. Cl. ...................................... 56/380; 56/377
[58] Field of Search ........................ 56/372, 376–380, 56/384, DIG. 21

[56] References Cited

U.S. PATENT DOCUMENTS 4,723,402 2/1988 Webster et al. ...................... 56/377

Primary Examiner—Thuy M. Bui
Attorney, Agent, or Firm—Andrus, Sceales, Starke & Sawall

[57] ABSTRACT

This invention concerns a pull type hay rake which has the particularity of having an upside down "V" shape and to have two movable side elements, that open automatically when need for working and they close automatically when one has to transport on the road. Furthermore, this invention forsees the addition of other elements as optionals so as to increase or decrease its performances.

12 Claims, 3 Drawing Sheets

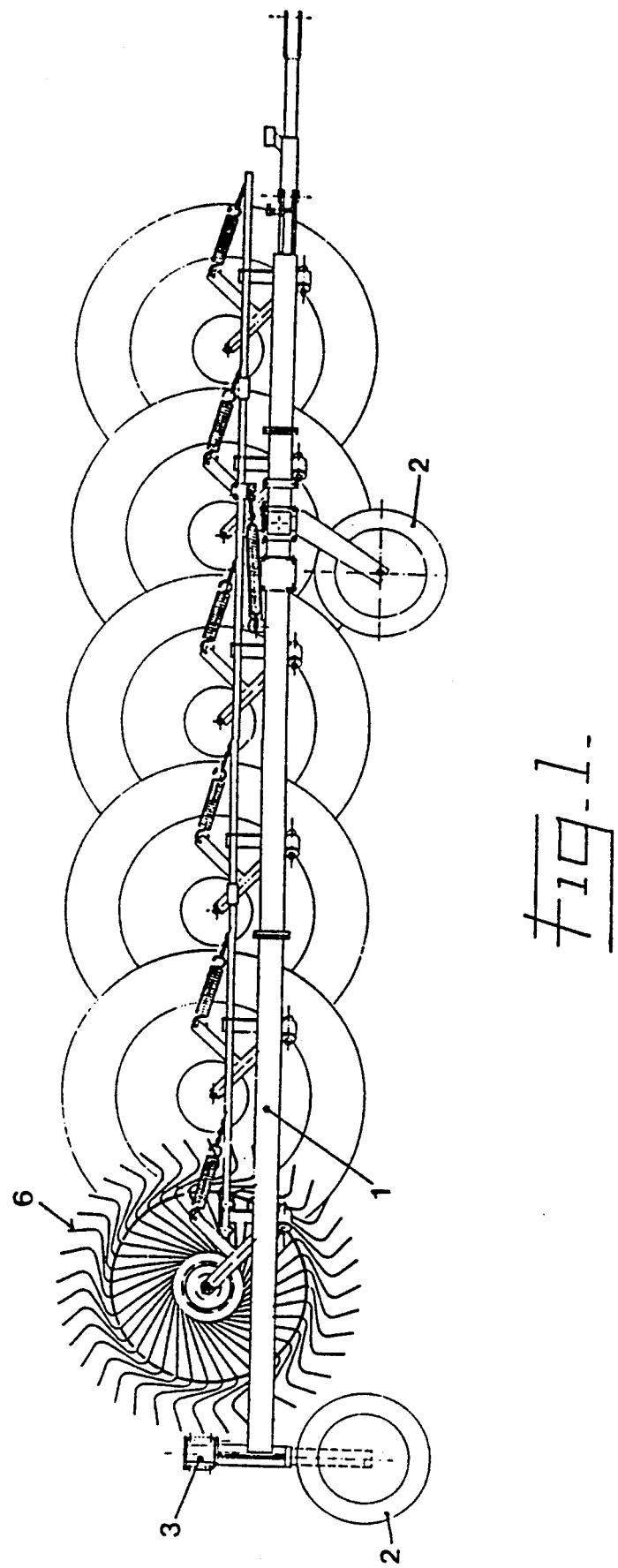

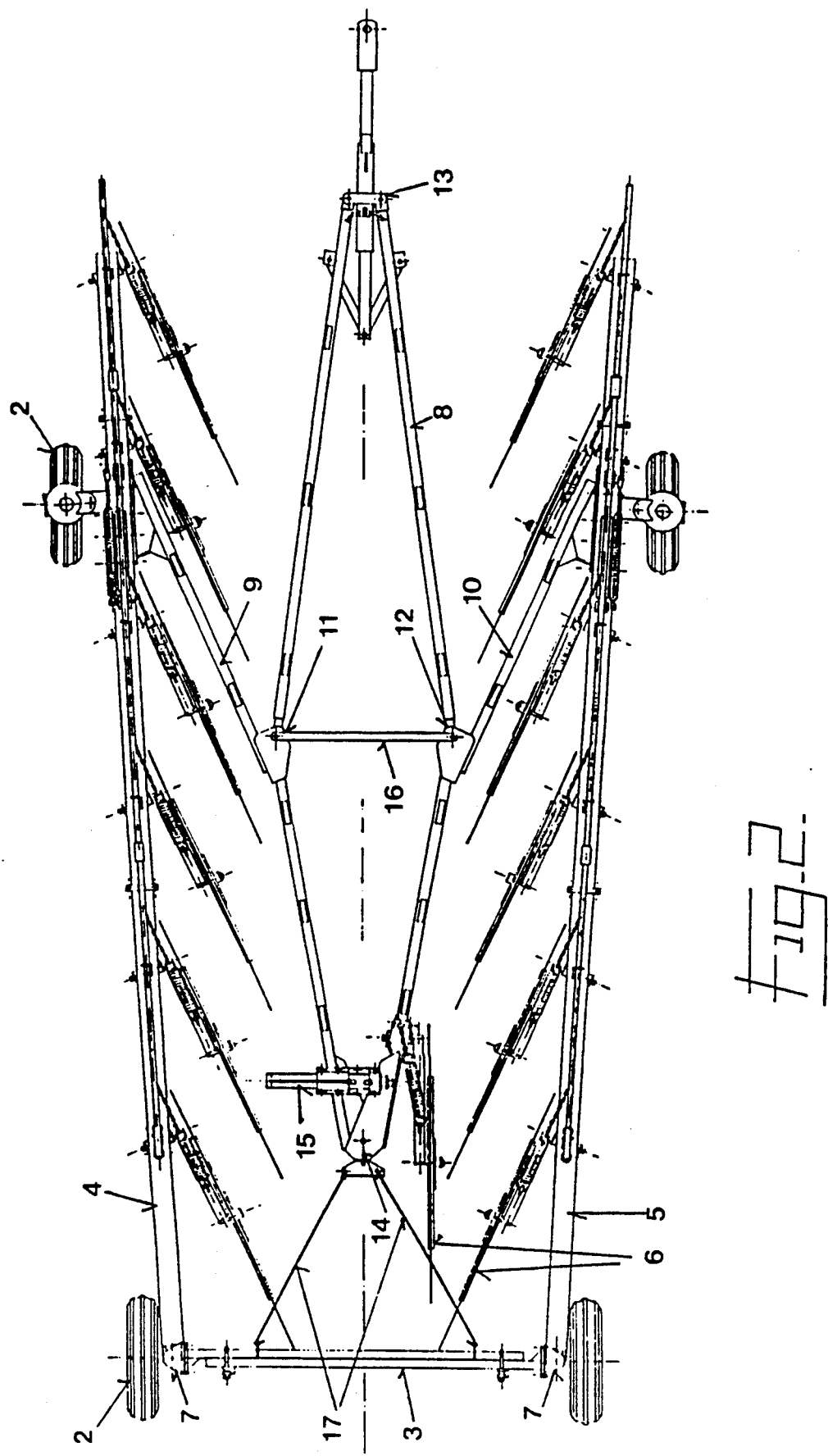

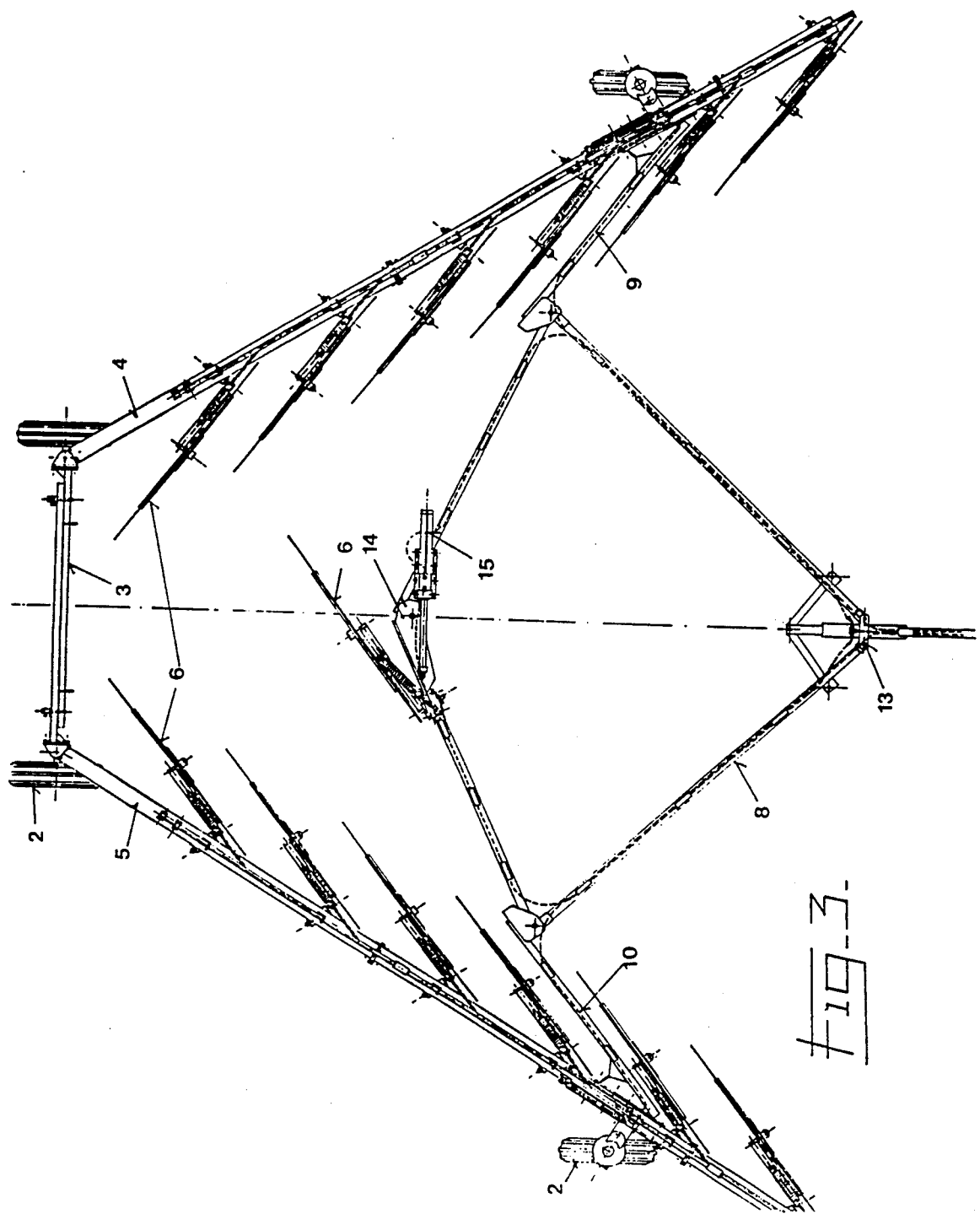

PULL TYPE BIFOLD HAY RAKE

BACKGROUND AND SUMMARY

This invention concerns a pull type hay rake which has the particularity of having an upside down "V" shape and to have two movable side elements that open automatically when needed for working, and they close automatically when one has to transport on the road. Furthermore, this invention foresees the addition of other elements as optionals so as to increase or decrease its performances.

The object of this invention is a bifold hay rake suitable for hay making which works on wide dimensions to gather and/or move the grass once it has been cut and following the drying process. This implement is drawn by a tractor that permits it to operate on both sides, as the side arms, which have an upside down "V" shape, to automatically widen, with a command, and gather together the grass or hay towards the center with the use of a rake wheel which has the purpose of moving the gathered product in order to favor the next operation of the harvesting.

At the actual stage of technology, there are already rakes on the market to move and/or gather together hay, but they are normally made up with one arm carrying many rake wheels. As a result, it has been noticed that, particularly in large areas of land, this implement takes a long time to effect its work as it has to go over the same piece of land many times in order to terminate the job properly.

Therefore it was decided to realize an implement that allowed, in particular, a great reduction in working time by nearly half and, therefore, even a convenience in the total cost of the product.

Firstly, it was foreseen to realize a simple pull type structure, which could be drawn by a tractor and could be assembled on tires, or even not, which would have two side, horizontal, hinged, upside down "V" shaped arms, that with a command, open and close.

In fact, during working operations, opening the two arms which carry the rake wheels, the rake covers a larger area, while when transporting, with a command the two arms close nearly parallel occupying very little space width wise and therefore permitting normal transit on the roads.

Another particularity of this invention concerns the use of a center rake wheel, or nearly central, that is near the summit of the "V" or the two side arms. This center rake wheel has the function of moving the grass or hay right behind the tractor in order to favor the next operation of the harvesting of the product.

Furthermore, the horizontal side arms can be made of pieces put together, in other words made of pieces that can be assembled and disassembled to make up a rake of more or less rake wheels (e.g. for each arm, 5 or 6 or 7 rake wheels). These arms are hinged onto a beam (acting as the back axle with wheel) which can be lengthened or shortened telescopically or with another system which allows for other adjustments during the working phase.

The implement is made automatic, in particular, in the opening or closing of the two arms which carry the rake wheels, by an oleodynamic system with the control on the tractor, which acts directly on the parallelogram structure, variable or variable polygon, permitting the two said arms to open wide or close.

The above said operations are more favorable and give quicker results if the implement is in movement.

Naturally, automatisms and controls can be different to those indicated, known to the technicians of the sector, without exiting from the above-mentioned principles, for the opening and closing of the arms and lowering of the rake wheels to the ground.

An additional variation to the present invention, is to produce an implement which is not automatic, but manual, in particular regarding the two above-mentioned phases. In fact it is possible to close the two arms by simply reversing back with the tractor and then manually stopping them in the "open" position: the same goes for the opening phase by uncoupling and towing of the implement and blocking into position.

BRIEF DESCRIPTION OF THE DRAWINGS

A mechanical execution of the present invention is represented in the three technical drawings herewith enclosed:

FIG. 1 shows the side of a rake and the two side arms "V" shaped upside down, with six rake wheels and a center wheel;

FIG. 2 shows the same rake as FIG. 1 in a closed position, or the position ideal for transport on the road;

FIG. 3 shows the same rake as FIG. 2, but in a working position, that is with the two arms in the working position. FIG. 3 also shows the central part, the variable polygon actioned by an oleodynamic cylinder.

DETAILED DESCRIPTION

According to the invention, the rake is made up of a frame (1) upside down "V" shaped, assembled onto four tires (2). On the back, there is an axle (3) (which can be lengthened or shortened, thus allowing to increase the width of work, either telescopically or simply with ideal mechanical tightening methods) from which two arms (4) and (5) open up, carrying rake wheels (6), hinged at joints (7) and kept into place by another internal structure (8). This last mentioned structure (8) is formed of a variable polygon with four sides and is collegated to the side arms (4) and (5) by two rods (9) and (10) that are hinged, in the proximity of the two opposite summits (11) and (12) of the same polygon. The other two summits in the front (13) act as the draw bar and connection to the P.T.O. of the tractor and/or of command, while the one at the back (14) will be equipped with an oleodynamic cylinder (15) that will have the task to act on the two adjoining sides of the polygon (8).

The side arms (4) which carry the rake wheels (6), are units which can be put together or taken away, so as to allow the composition of a short or long implement according to the requirements needed (in this case, we present two arms with six rake wheels (6) each).

The rake wheels (6) are in an up position during transport on the road and are lowered to the ground for the working position either mechanically or automatically.

As the rake is very wide to the sides, the center zone remains without a rake wheel, so it was decided to apply one rake wheel (6) in the proximity of the back of the summit of the polygon (8) with the task of moving the grass or hay in the center zone.

During transport on the road, the arms (4) or (5) are closed nearly parallel, and the back axle (3) narrowed down to its minimum. The polygon (8) is kept in its position, for major security, by a crossbar (16) that connects the two opposite summits so as to prevent its accidental opening. Also, to avoid surprises, the back summit is connected to the axle (3) with two rods (17). With this arrangement, the implement is closed securely with a minimum of side volume.

The working phase of the machine foresees the elimination of the pole (16) and of the two rods (17) and the lengthening of the axle (3), with the actioning of the oleodynamic cylinder (15). With this actioning, the central polygon (8) tends to widen and consequently even the two wide arms (4) and (5) widen. The next step is to lower the rake wheels and the implement is ready to work.

It is well understood that this invention is not limited to the examples herewith described. Starting from this base we foresee the execution of the forms and modes without exiting from the spirit of this invention as postulated in the claim.

I claim:

1. A pull type bifold rake, comprising:
   a cross member;
   a pair of rake arms, each having a plurality of rotatable rake wheels mounted thereto, and each rake arm being pivotably mounted at one of its ends to the cross member; and
   a closed polygonal frame assembly disposed between the pair of rake arms and being interconnected with each rake arm at a point spaced from the pivotable mounting of each rake arm to the cross member, the frame assembly being movable between an operative position in which the frame assembly assumes a first closed polygonal configuration and in which the rake arms are pivoted about their pivotable mounting to the cross member away from each other to a position in which they are non-parallel to each other to form substantially a V-shape when viewed in plan, and a retracted position in which the frame assembly assumes a second closed polygonal configuration and in which the rake arms are pivoted inwardly toward each other; and
   means for moving the frame assembly between its operative position and its retracted position.

2. The bifold rake of claim 1, wherein movement of the frame assembly to its retracted position orients the rake arms substantially parallel to each other.

3. The bifold rake of claim 1, further comprising a rake wheel mounted to the frame and located substantially along the centerline of the V-shape formed by the rake arms when the frame assembly is in its operative position.

4. The bifold rake of claim 1, wherein the cross member to which the ends of the rake arms are mounted comprises an axle extending between a pair of wheels.

5. The bifold rake of claim 4, wherein the axle is constructed so as to allow it to be lengthened or shortened by an operator.

6. The bifold rake of claim 1, wherein the polygonal frame assembly is substantially symmetrical about the centerline of the V-shape formed by the rake arms when the frame assembly is in its operative position.

7. The bifold rake of claim 6, wherein the frame assembly comprises a series of frame members pivotable connected to each other.

8. The bifold rake of claim 7, wherein the frame assembly includes two frame members on either side of said centerline, with two of the pivotable connections between the frame members being disposed on said centerline.

9. The bifold rake of claim 1, wherein the frame assembly comprises a plurality of frame members pivotable connected to each other, and wherein the frame assembly moving means comprises a cylinder having an extendable and retractable rod interposed between two of the frame members, wherein extension of the cylinder rod moves the frame assembly to its operative position and retraction of the rod moves the frame assembly to its retracted position.

10. The bifold rake of claim 1, wherein the frame assembly comprises a plurality of frame members pivotable connected to each other, and further comprising retainer means interconnected with the frame members for retaining the frame assembly in its retracted position.

11. The bifold rake of claim 10, wherein the retainer means comprises a crossbar for interconnected the frame members, and a pair of rods for connecting the frame members to the cross member.

12. The bifold rake of claim 1, wherein the ends of each rake arm are mounted to the cross member adjacent a wheel mounted at an end of the cross member, and further comprising a wheel assembly located toward the other end of each rake arm.

* * * * *